Jan. 25, 1966    C. SAURER    3,231,039
AUTOMOTIVE VEHICLE DRIVE SHAFT ASSEMBLY
Filed Jan. 26, 1961
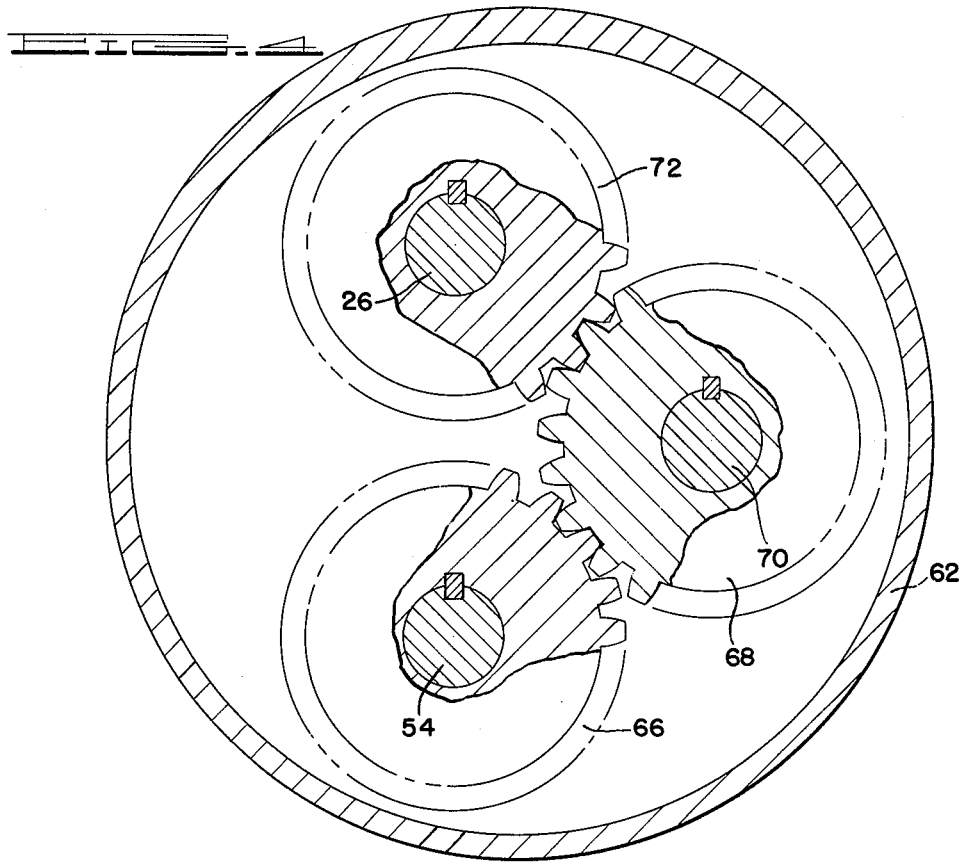
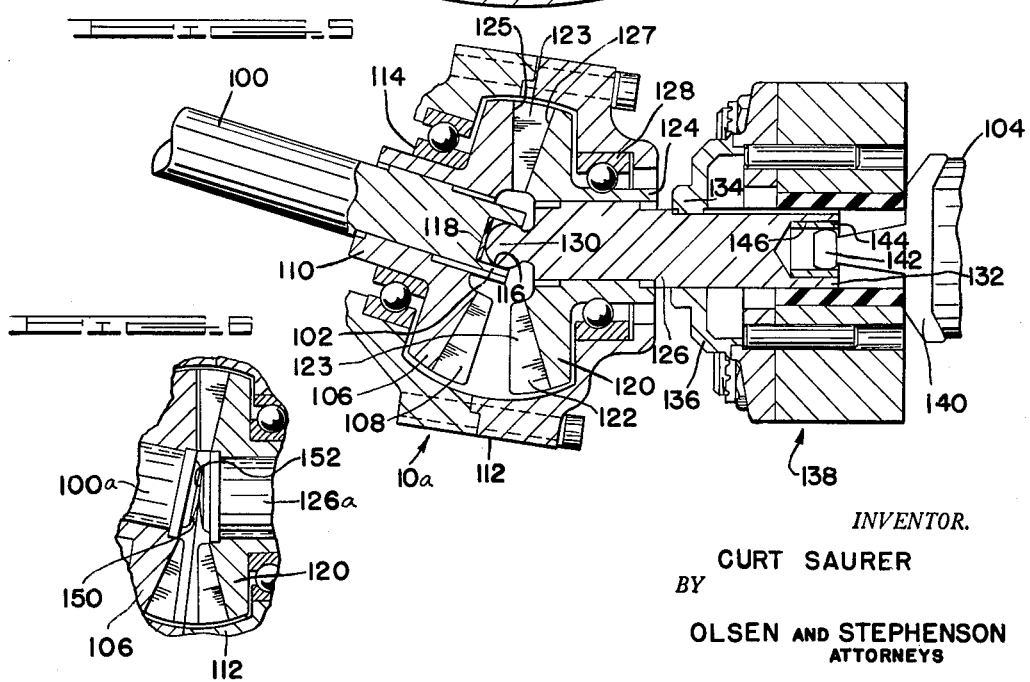
INVENTOR.
CURT SAURER
BY
OLSEN AND STEPHENSON
ATTORNEYS United States Patent Office 3,231,039
Patented Jan. 25, 1966

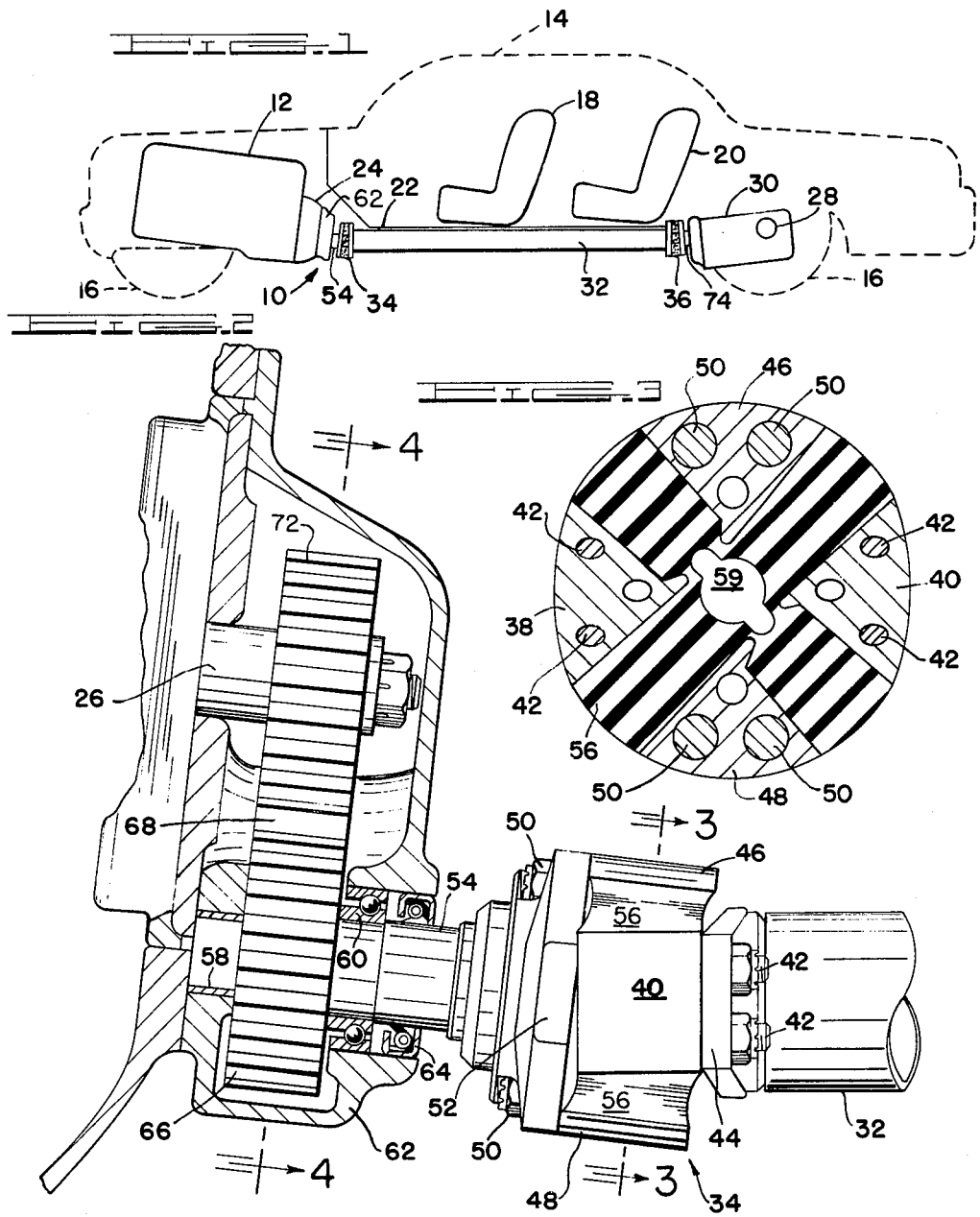

3,231,039
AUTOMOTIVE VEHICLE DRIVE SHAFT
ASSEMBLY
Curt Saurer, Oak Park, Mich., assignor to Thornton Products Company, Dearborn, Mich., a corporation of Michigan
Filed Jan. 26, 1961, Ser. No. 85,157
3 Claims. (Cl. 180—70)

This invention relates generally to automotive vehicles and more particularly to a drive shaft assembly for an automotive vehicle.

One very objectionable feature in modern automobiles is the hump or tunnel in the floor board. This hump is necessary to provide space for the transmission and the drive shaft assembly. In order to eliminate the hump, it is necessary to lower the drive shaft assembly to a position below the floor boards and move the transmission either to the rear of the vehicle or to a position underneath the front seat. In order to locate the rear end of the engine output shaft at a height such that it can be connected to the drive shaft assembly when it is below the floor board, it is necessary to position the engine at an angle such that the output shaft extends downwardly and rearwardly. Such an arrangement thus involves a connection of a substantially horizontal drive shaft to a downwardly and rearwardly inclined engine output shaft. Universal joints can be used for this connection but these joints are not only expensive but are subject to excessive vibrations and noise in such installations because they are subject to the normal twisting and deflecting of the vehicle frame during travel of the vehicle. It is an object of this invention, therefore, to provide a drive shaft assembly which includes one or more flexible couplings of the type disclosed in my Patent No. 2,876,635, which are capable of accommodating the side loads to which the assembly is subjected and which also dampen vibrations and eliminate the transmission of noise by virtue of their resilient construction.

In one embodiment of the invention a spur gear assembly is mounted on the rear end of the output shaft so as to lower a driven stub shaft to a level below the floor board and a flexible coupling capable of normal deflection through an angle equal to the angle of inclination of the output shaft is connected between the stub shaft and the drive shaft. In another embodiment of the invention an angular drive unit consisting of a pair of meshing gears is connected between the rear end of the output shaft and a flexible coupling connected to the drive shaft. In this latter embodiment, the angular drive unit takes up the angle of inclination between the output shaft and the drive shaft, and the flexible coupling accommodates angles between the output shaft and the drive shaft caused by twisting and deflecting of the vehicle frame.

A further object of this invention is to provide a drive shaft assembly which is quiet in operation, economical to manufacture, and is readily installed in an automotive vehicle so as to avoid the necessity for any floor board tunnel or hump.

Still further objects of this invention will become apparent from a consideration of the following description, the appended claims, and the accompanying drawing in which:

FIGURE 1 is a diagrammatic view of an automotive vehicle showing the drive shaft assembly of this invention installed thereon;

FIGURE 2 is a fragmentary sectional view of one end portion of the drive shaft assembly of this invention;

FIGURE 3 is a transverse sectional view of a flexible coupling in the assembly of this invention looking substantially along the line 3—3 of FIG. 2;

FIGURE 4 is an enlarged transverse sectional view of a drive gear unit in the assembly of this invention, looking substantially along the line 4—4 in FIG. 2;

FIGURE 5 is a fragmentary sectional view of a modified form of the drive shaft assembly of this invention; and FIGURE 6 is a fragmentary sectional view, illustrated similarly to FIG. 5 of a portion of another modified form of the drive shaft assembly of this invention.

With reference to the drawing, the drave shaft assembly of this invention, indicated generally at 10, is illustrated in FIG. 1 in assembly relation with an engine 12 in a vehicle 14. The vehicle 14 includes the usual ground wheels 16, front seat 18, rear seat 20, and a substantially flat floor board 22. A housing 24, for a clutch or torque converter mechanism, is mounted on the rear end of the engine 12 and enclosed a shaft 26 which is driven by the engine 12 and is hereinafter referred to as the output shaft. As shown in FIG. 1, the engine 12 is mounted so that it is inclined downwardly and rearwardly in the vehicle 14 so that the output shaft 26 is similarly inclined downwardly and rearwardly. In the illustrated embodiment of the invention this inclination is in the neighborhood of 5° to 7° relative to a horizontal plane.

The vehicle 14 is also equipped with a rear axle 28 and a transmission unit 30 which is positioned adjacent the axle 28 at the rear of the vehicle 14. The transmission 30 may be located underneath the front seat 18 and connected to the rear axle 28 by a rearwardly extending shaft, and is shown adjacent the axle 28 merely for purposes of illustration.

The drive shaft assembly 10 includes a drive shaft 32 which is positioned immediately below and adjacent the floor board 22 and is illustrated as being of tubular shape. At its front and rear ends the drive shaft 32 is connected to a pair of flexible couplings 34 and 36, only the coupling 34 being illustrated in detail since the couplings are identical. The coupling 34 (FIG. 3) shown in my prior Patent No. 2,876,635 and reference thereto is made for a specific description of the coupling. In general, the coupling 34 consists of a pair of driven segments 38 and 40, each of which is formed of a rigid material such as steel and is in the general shape of a cylinder segment, which are positioned substantially diametrically opposite each other and are secured by bolts 42 to a plate 44 secured to the forward end of the drive shaft 32. A pair of driving segments 46 and 48 which are likewise rigid are interposed between the segments 38 and 40 and are circumferentially spaced therefrom, so that all of the segments are in a common plane. The segments 46 and 48 are secured by bolts 50 to a plate 52 which is secured to the rear end of a stub shaft 54. As shown in FIG. 2 the stub shaft 54 is positioned so that it is parallel to the output shaft 26 and is thus at an angle relative to the drive shaft 32.

The spaces between the opposing faces of the segments 38, 40, 46 and 48 are occupied by a resilient body 56 formed of a material such as rubber or a suitable plastic, such as polyurethane, which is bonded to the opposite faces of each of the rigid segments. The resilient body 56 is illustrated as being in the shape of a cross having the legs extended between adjacent segments 38, 40, 46 and 48 and having an irregularly shaped axial opening 59. The body 56, by virtue of its resilience is capable of deflecting under load sufficiently to take up the angle between the shafts 32 and 54 to thus provide for a driving connection of the angularly related shafts 54 and 32, as illustrated in FIG. 2. By virtue of its resilient construction, the flexible coupling 34 is capable of deflecting relative to substantially any plane and in this respect functions like a universal joint.

The forward end of the shaft 54 is journaled on bearings 58 and 60 carried by a cover member 62 mounted on the rear side of the housing 24. A seal assembly 64 is also mounted on the cover 62 adjacent the bearing 59 so that the seal assembly 64 surrounds the shaft 54. A first spur gear 66 secured to the shaft 54 and positioned within the cover 62 meshes with an idler gear 68 which is mounted on a shaft 70 carried by the housing 24 and the cover 62. The gear 68 also meshes with a gear 72 secured to the rear end of the output shaft 26 and positioned within the cover 62.

It can thus be seen that the gears 66, 68 and 72 function to transmit drive from the output shaft 26 to the stub shaft 54 which is positioned below the shaft 26 at substantially the level of the drive shaft 32, to thus lower the drive of the output shaft 26 to the level of the drive shaft 32. The flexible coupling 34 in turn functions to provide for a driving connection of the angularly related shafts 54 and 32. The flexible coupling 36 at the rear end of the shaft 32 transmits the drive from the substantially horizontal drive shift 32 to another stub shaft 74 which is inclined upwardly and rearwardly and is associated with the transmission 30 so as to provide the drive therefor. As a result of the lowering of the drive from the output shaft 26 by the gears 66, 68 and 72 and the driving connection provided between the shafts 54 and 32 by the flexible coupling 34, the drive shaft 32 is located below the floor board 22 so as to eliminate any necessity for a hump or tunnel in the floor board 22.

A modified drive shaft assembly, indicated generally at 10a, is illustrated in FIG. 5. In the assembly 10a the engine output shaft 100, corresponding to the shaft 26 shown in FIGS. 1 and 2, is inclined downwardly and rearwardly at an angle to the horizontal which is greater than the inclination of the shaft 26 and which is sufficient to position the rear end 102 of the shaft 100 at substantially the horizontal level of a drive shaft 104 corresponding to the drive shaft 32. This inclination of the shaft 100, which is about 15° to 20° relative to the horizontal in one embodiment of the invention, requires a corresponding inclination of the engine 12. A gear 106 having teeth formed on one face and a flange 110 extending forwardly from the opposite face is positioned within a two-piece housing 112 which is mounted on the rear end of the housing 24 and encloses the rear end 102 of the shaft 100. The flange 110 is splined on the rear end of the shaft 100 and is rotatably mounted in a bearing 114 carried by the housing 112. The rear end 102 of the shaft 100 is formed with an axial cavity 116 and a resilient disc 118 is positioned in the cavity 116 for a purpose to appear presently.

A second gear 120 has teeth 122 on one face which mesh with the teeth 108 on the gear 106 and a rearwardly extending flange 124 on its opposite face. The meshing teeth 108 and 122 are of a shape such that their sides or faces 123 which engage are generally frusto-triangular in shape in that they are of a progressively increasing width in a direction radially outwardly of their gears and have radially outwardly diverging inner and outer edges 125 and 127, respectively, to provide for a full face-to-face engagement of the teeth faces 123 at the top sides of the angularly related shafts 100 and 126, as shown in FIG. 5. The flange 124 is splined on a stub shaft 126 and is rotatably supported in a bearing 128 carried by the housing 112. The forward end of the shaft 126 is formed with a ball 130 which is of a size to be supported in the cavity 116 and is engageable with the disc 118. Adjacent its rear end 132 the stub shaft 126 is spline-connected to a flange 134 on a plate 136 which is secured to the driving segments in a flexible coupling 138 identical to the flexible coupling 34 previously described. The driven segments in the coupling 138 are connected to a plate 140 secured to the forward end of the drive shaft 104. The plate 140 is formed with a forwardly extending ball 142 which fits in a bearing sleeve 144 pressed into an axial cavity 146 formed in the rear end 132 of the stub shaft 126.

In the assembly 10a, the output shaft 100 drives the gear 106 which in turn drives the gear 120 by virtue of the meshing engagement of the teeth 108 and 122 at the top sides of gears 106 and 120. The gear 120 rotates the shaft 126 so as to drive the drive shaft 104 through the flexible coupling 138 which will flex or yield sufficiently in a plurality of planes to compensate for any angularity caused between shafts 126 and 104 during twisting or deflecting of the vehicle frame caused by vehicle travel. The angle between the shaft 100 and the shaft 104 is taken up by the angular drive unit consisting of the gears 106 and 120. The provision of the balls 130 and 142 at the ends of the stub shaft 126 provides added support for this shaft. With this arrangement, the drive shaft 104 is readily located below the vehicle floor board 22 so as to eliminate the necessity for the usual floor board hump or tunnel. The rear end of the drive shaft 104 is connected to the transmission unit 30 in the same manner heretofore described in connection with the drive shaft 32. The resilient disc 118 in the assembly 10a reduces the noise caused by the engagement of the shafts 100 and 126.

In FIG. 6 an alternative arrangement of the output and stub shafts is illustrated. As shown in FIG. 6, a shaft 100a, corresponding to the shaft 100, is provided with an end face 150, which is illustrated as being of a conical shape and which could be of a frusto-conical shape, which engages a similarly shaped face 152 on the forward end of a shaft 126a corresponding to the shaft 126. As a result, the faces 150 and 152 are engageable during rotation of the shafts 100a and 126a to provide for somewhat of a support of one shaft upon the other with a minimum of consequent noise.

From the above description it is seen that this invention provides automobile drive shaft assemblies 10 and 10a which utilize flexible couplings of a particular construction to take up the necessary angularity existing between drive and driven shafts during use of the automobile. These couplings also function to deaden and absorb noise in the assembly, by virtue of the resilient body 56 in each coupling, to thus enable the assemblies to be used in modern vehicles.

It will be understood that the automotive vehicle drive shaft assemblies which are herein disclosed and described are presented for purposes of explanation and illustration and are not intended to indicate limits of the invention, the scope of which is defined by the following claims.

What is claimed is:

1. In a vehicle having an engine provided with a downwardly and rearwardly inclined output shaft located adjacent the forward end of the vehicle, a drive shaft assembly for transmitting the drive from said output shaft rearwardly of said vehicle, said drive shaft assembly comprising a gear housing mounted on said engine, a first gear secured to said output shaft adjacent one end thereof and disposed in said housing, means rotatably supporting said output shaft and first gear on said housing, a stub shaft arranged at an acute angle relative to and constantly engaged at one end with said one end of said output shaft, a second gear secured to said stub shaft and positioned in meshing engagement with said first gear, means rotatably supporting said second gear and said stub shaft on said housing, a flexible coupling comprising circumferentially spaced drive and driven members and resilient means secured to and extending between said members, means securing said drive member to said stub shaft, and shaft means connected to said driven members in said flexible coupling and extending rearwardly of said vehicle therefrom in a substantially coaxial relation with said stub shaft, 2. The combination of claim 1 including coacting ball and socket means on the adjacent ends of said output and stub shafts.

3. The combination of claim 1 including substantially conical end faces on the adjacent ends of said output and stub shafts, portions of said end faces being arranged in abutting engagement.

References Cited by the Examiner

UNITED STATES PATENTS

| | | | |
|---|---|---|---|
| 565,935 | 8/1896 | Sperry | 64—14 |
| 1,239,643 | 9/1917 | Tonon | 180—70 |
| 2,213,277 | 9/1940 | Guy | 64—14 |
| 2,328,141 | 8/1943 | Haltenberger | 180—70 |
| 2,465,309 | 3/1949 | Happe et al. | 74—417 X |
| 2,616,273 | 11/1952 | Pringle | 64—14 |
| 2,629,991 | 3/1953 | Guy | 64—14 |
| 2,876,635 | 3/1959 | Sauer | 64—14 |
| 2,949,041 | 8/1960 | Wildhaber | 180—70 X |
| 2,963,106 | 12/1960 | Sampietro | 180—70 |

FOREIGN PATENTS 192,370   6/1907   Germany.

A. HARRY LEVY, *Primary Examiner.*

PHILIP ARNOLD, *Examiner.*